United States Patent
Ginocchio et al.

(10) Patent No.: US 7,302,143 B2
(45) Date of Patent: Nov. 27, 2007

(54) OPTICAL CABLE PROVIDE WITH A MECHANICALLY RESISTANT COVERING

(75) Inventors: Alessandro Ginocchio, Sesto San Giovanni (IT); Agusti Valls Prats, Villasanta (IT); Enrico Consonni, Seregno (IT)

(73) Assignee: Pirelli & C. S.p.A., Milan (IT)

( * ) Notice: Subject to any disclaimer, the term of this patent is extended or adjusted under 35 U.S.C. 154(b) by 39 days.

(21) Appl. No.: 10/479,484

(22) PCT Filed: May 28, 2002

(86) PCT No.: PCT/EP02/05849

§ 371 (c)(1),
(2), (4) Date: Jun. 4, 2004

(87) PCT Pub. No.: WO02/099491

PCT Pub. Date: Dec. 12, 2002

(65) Prior Publication Data

US 2004/0252954 A1   Dec. 16, 2004

Related U.S. Application Data

(60) Provisional application No. 60/301,819, filed on Jul. 2, 2001.

(30) Foreign Application Priority Data

Jun. 4, 2001 (EP) .................................. 01830365

(51) Int. Cl.
  *G02B 6/44* (2006.01)
(52) U.S. Cl. ....................... 385/100; 385/102
(58) Field of Classification Search ............. 385/100, 385/102, 103, 105, 106, 110, 113, 109
See application file for complete search history.

(56) References Cited

U.S. PATENT DOCUMENTS

| 4,104,210 A | 8/1978 | Coran et al. ............. 525/232 |
| 4,143,942 A | 3/1979 | Anderson ................. 385/113 |
| 4,334,733 A * | 6/1982 | Takeshima et al. ......... 385/141 |

(Continued)

FOREIGN PATENT DOCUMENTS

DE   3 107024   9/1982

(Continued)

*Primary Examiner*—Sung Pak
*Assistant Examiner*—Daniel Petkovsek
(74) *Attorney, Agent, or Firm*—Finnegan, Henderson, Farabow, Garrett & Dunner, L.L.P.

(57) ABSTRACT

An optical cable having at least one element for the transmission of optical signals and a structure that is able to protect the at least one element. The structure is a multilayer structure and is arranged in a position radially external to the at least one element and has a) at least one first covering layer of polymeric material in a position radially external to the at least one element; b) at least one covering layer of foamed polymeric material in a position radially external to the at least one first covering layer, and c) at least one second covering layer of polymeric material in a position radially external to the at least one covering layer of foamed polymeric material. The foamed polymeric material has a density between 0.3 and 0.7 kg/dm³ and tensile modulus at 20° C. between 300 and 700 MPa.

18 Claims, 5 Drawing Sheets

U.S. PATENT DOCUMENTS

| | | | | |
|---|---|---|---|---|
| 4,344,669 A | * | 8/1982 | Uchida et al. | 385/141 |
| 4,491,386 A | | 1/1985 | Negishi et al. | 385/109 |
| 4,770,489 A | | 9/1988 | Saito et al. | 385/113 |
| 4,916,198 A | | 4/1990 | Scheve et al. | 526/351 |
| 4,930,860 A | * | 6/1990 | Tansey et al. | 385/106 |
| 4,976,519 A | * | 12/1990 | Davey et al. | 385/102 |
| 5,243,675 A | * | 9/1993 | Kathiresan et al. | 385/109 |
| 5,333,229 A | | 7/1994 | Sayegh | 385/102 |
| 6,066,397 A | * | 5/2000 | Risch et al. | 428/379 |
| 6,178,277 B1 | * | 1/2001 | Ravela et al. | 385/109 |

FOREIGN PATENT DOCUMENTS

| | | |
|---|---|---|
| EP | 0 324430 A1 | 7/1989 |
| EP | 0405549 A1 | 1/1991 |
| GB | 1 451232 | 9/1976 |
| GB | 2159291 A | 11/1985 |
| GB | 2 184 863 | 7/1987 |
| WO | WO 97/21950 | 6/1997 |
| WO | WO 98/52197 | 11/1998 |
| WO | WO 00/05730 | 2/2000 |

* cited by examiner

OPTICAL CABLE PROVIDE WITH A MECHANICALLY RESISTANT COVERING

CROSS REFERENCE TO RELATED APPLICATIONS

This application is a national phase application based on PCT/EP02/05849, filed May 28, 2002, the content of which is incorporated herein by reference, and claims the priority of European Patent Application No. 01830365.1 filed Jun. 4, 2001, the content of which is incorporated herein by reference, and claims the benefit of U.S. Provisional Application No. 60/301,819, filed Jul. 2, 2001, the content of which is incorporated herein by reference.

BACKGROUND OF THE INVENTION

1. Field of the Invention

The present invention relates to an optical cable for telecommunications and/or for data transmission, which is particularly suitable for installations of the terrestrial type.

In particular, the present invention relates to an optical cable comprising at least one element for the transmission of optical signals and a multilayer protective structure arranged in a position radially external to said at least one element, said protective structure endowing said cable with high mechanical strength, mainly with respect to lateral stresses such as, for example, impact and/or compression.

In the present description, and in the claims that follow, the term "element for the transmission of optical signals" means any transmission element comprising at least one optical fiber. Therefore this term identifies both a single optical fiber, and a plurality of optical fibers, possibly combined together to form a bundle of optical fibers or arranged parallel to one another and covered with the same covering to form a tape (ribbon) of optical fibers.

Moreover, this term is also intended to include configurations that are more complex than a single optical fiber or a plurality of optical fibers. Therefore said term includes one or more optical fibers arranged inside a containment structure, for example a tubular element, a sheath, a microsheath or a grooved core. Preferably, said tubular element, sheath or microsheath is made of a polymeric material. Moreover, said tubular element, sheath or microsheath can be contained within the grooves possessed by said grooved core.

In accordance with current terminology, one or more of said containment structures, enclosing one or more optical fibers therein, is conventionally indicated by using the term "optical core". For example, an optical core can be formed by a plurality of tubular elements made of polymeric material, stranded together around a central reinforcing element. Optionally, said optical core can in addition include fabrics and/or tapes, for example waterswallable fabrics and/or tapes, which can be used for making the aforesaid stranding.

In the present description, and in the claims that follow, the term "optical cable" means a fiber-optic cable, i.e. a cable provided with at least one element for the transmission of optical signals.

2. Description of the Related Art

With particular reference to applications of the terrestrial type, during the step of laying and/or the step of transport of an optical cable, the latter may be subjected to accidental impacts and/or compressions, due for example to the falling of large lumps of excavated material or of tools used during cable installation, onto the cable arranged in the cable-laying trench.

This accidental falling can cause not only a violent and substantially instantaneous impact action on the cable, but also a constant compressive action for a longer time, until the caved-in excavated material and/or the excavating equipment that is inadvertently resting on or has fallen on the surface of the cable is removed, therefore exerting a continuous compressive action.

Accordingly, to preserve its structural integrity, an optical cable is generally provided with at least one protective covering that is able to endow said cable with suitable mechanical strength.

In fact it must be emphasized that, in the absence of suitable measures for protection, any mechanical actions of impact and/or of compression (crushing), even of moderate magnitude, acting on the core of an optical cable, can be transmitted directly to the individual optical fibers contained inside said core, first of all causing an increase in attenuation of the optical signal transmitted by said fibers and then, if the phenomenon persists, breakage of said fibers.

In fact, the optical fibers, by themselves or even arranged inside a containment structure as above, have limited mechanical strength and are particularly sensitive to mechanical actions acting on them from outside, even though of low intensity.

Minimal deformations of said fibers as well as of the containment structures of the latter, especially in the case when the deformed structures come into contact with the fibers, lead to deformation of the fibers themselves with consequent degradation of their transmission characteristics. The phenomenon of micro deformation of the structure of a fiber that leads to attenuation of the signal being transmitted by the fiber is commonly indicated by the term "microbending".

For the purpose of endowing an optical cable with a predetermined mechanical strength suitable to resist external forces, such as impact and/or compression, it is known in the art the use of armours, generally metallic, that are arranged in a position radially external to the optical core for protecting the latter.

In general, said armours are provided by applying a metallic strip, preferably corrugated, formed longitudinally around the cable or by stranding a plurality of metal wires wound in a helical configuration. In this connection, see for example document U.S. Pat. No. 4,491,386.

The provision of an optical cable with a cushioning layer made of a sufficiently soft material, for example a foamed plastic material, for protecting the optical fibers of said cable, is also known in the prior art.

Said cushioning layer can be combined with various constitutive elements of the cable. For example, it can be arranged inside the optical core to surround each individual tubular element containing the optical fibers or to form the tubular element itself, or it can be arranged externally to said optical core, for example in a position directly beneath the external polymeric sheath of the cable.

For example, document GB-1,451,232 envisages the use of a layer of compressible material that is able to reduce the deformation of the fibers if the optical cable is subjected to stressing such as to submit one or more fibers to longitudinal tensile stresses. In the presence of such a stressed state, one or more optical fibers move transversely to the cable. However, since said fibers come into contact with said compressible cushioning layer and compress it inwards, partially penetrating into it, the deformation of the fibers is reduced considerably.

A further example of a cushioning layer made of soft material, for example of foamed plastic material with an elastic modulus preferably below 100 MPa, is described in document DE-3,107,024. This layer is used for protecting the optical fibers against transverse forces acting laterally on the optical cable.

Further types of embodiments involving the use of cushioning layers of the type as above are described, for example, in documents GB-2,159,291 and GB-2,184,863.

A further solution aiming to increase the mechanical properties of an optical cable, in particular impact strength and compressive strength, is described in document U.S. Pat. No. 4,770,489.

Said document relates to an optical cable having improved tensile strength and a wider range of working temperatures owing to the presence of at least one rigid tension member, made of fiber-reinforced plastic material, possessing a high Young's modulus and low coefficient of thermal expansion, it being possible to make said element either in the form of a covering, or in the form of one or more threads that extend longitudinally to the cable and are incorporated within the latter.

Said document points out that, for the purpose of endowing the optical cable with high impact strength and compressive strength, as well as to allow a high installation tension without lowering the transmission capabilities of the cable itself, the latter should be provided with at least one rigid tension member as above and with an outer sheath of reinforced plastic material, for example reinforced with fibers such as fibers of glass, Kevlar®, fibers of graphite embedded in an epoxy resin matrix.

In accordance with some embodiments that are described, document U.S. Pat. No. 4,770,489 envisages, furthermore, that the optical cable can be provided with a cushioning layer that is able to increase the characteristics of bending and curvature of said cable. Preferably said cushioning layer is made of a fibrous material such as Kevlar® or a polypropylene yarn. If required, said layer can be made of a expanded material, for example polyethylene.

Document WO 00/05730, in the name of the same Applicant, relates to a hybrid optical/electric cable suitable for installation along overhead lines for telecommunications and for electric power distribution, especially at medium voltage.

Said cable comprises a three-phase electric cable with insulated conductors which is wound around a carrying rope including an optical core enclosed in a tubular structure that is resistant to transverse compression.

Generally, said tubular structure consists of a metal sheath (which may also be resistant to corrosion, for example aluminium or stainless steel) or of high-modulus polymeric material (for example polypropylene, modified polypropylene, polybutylene terephthalate (PBT), polyether-imides, polyether-sulphones).

Said tubular structure can, moreover, consist of a foamed polymeric material of the type described in patent application WO 98/52197, in the name of the same Applicant, capable of dissipating the energy that derives from transverse compressive forces that can arise during production, installation and/or operation of the cable and, as mentioned above, that can damage the optical fibers with consequent attenuation of the optical signal being transmitted.

Said compressive forces can be caused either by the insulated phase conductors, which, under the action of a high tensile force, compress the carrying rope and hence the optical fibers contained therein, or by the cable supporting structure which, when placed under tension, tends to reduce its own diameter and hence the internal space that accommodates said fibers.

According to a particular embodiment described in the aforesaid document WO 00/05730, said hybrid cable includes an optical core provided with a reinforcing member around which a plurality of tubular elements are arranged for containing the optical fibers embedded in a buffering filler.

In accordance with said embodiment, the tubular elements are held in position around said reinforcing member, if necessary stranded together according to a preferred helical configuration, by means of one or more tapes which, in addition to performing the binding of said core, can also perform mechanical and/or thermal functions.

In light of the solutions known in the prior art, the Applicant has perceived the need to provide an optical cable, particularly suitable for applications of the terrestrial type, endowed with high mechanical properties in terms of impact strength and compressive strength and which, at the same time, is able to guarantee high performance both in terms of lightness and of flexibility.

In fact the Applicant has found that the solutions of the prior art present several disadvantages.

For example, a cable that is provided with a metallic armour has a considerable increase in weight, which affects not only the step of installation of said cable, but also the step of transport of the cable with an inevitable increase in costs.

Moreover, a cable provided with the aforesaid armour has high flexural rigidity which, combined with said increase in weight, significantly limits the length of the cable to be installed, especially in the case of installations in the ground, inside of existing conduits.

Finally, there are quite considerable drawbacks to providing a metallic armour in the structure of a cable. For example, in the case of buried cables, the presence of metallic elements requires earthing of the cable for reasons of safety and its protection by means of a guard rope suitable to preserve the cable by acting as a sacrificial element. Therefore, this means that both the method of production and the method of installation of the cable are complex and, as a consequence, burdensome both in economic terms and in terms of time.

The solution described in document U.S. Pat. No. 4,770,489 is particularly complex as it envisages the positioning of several rigid tension members to be arranged inside the structure of a cable.

Furthermore, that solution causes a significant increase in weight as well as in flexural rigidity of said cable.

With regard to the solutions known in the art that envisage the use of a cushioning layer for protecting the optical fibers possessed by an optical cable, the Applicant has found that, in view of the softness of the material used, said layer is not able to guarantee sufficient protection when impacts and/or compressions of a high magnitude, such as those caused for example by the falling of excavation debris placed at the edge of the laying trench, accidentally impinge on a cable arranged at the bottom of said trench.

The Applicant, starting from the particular embodiment described in document WO 98/52197, mentioned above, has found that it is possible to optimize the impact strength of an element for the transmission of optical signals arranged in a position radially internal to a covering layer of foamed polymeric material.

SUMMARY OF THE INVENTION

In particular, the Applicant has perceived that, for the purpose of obtaining an optical cable that is resistant to impacts and to compressive forces, as well as being advantageously light and flexible, in a position radially external to the optical core of said cable, it is necessary to provide a protective structure comprising at least one covering layer of foamed polymeric material interposed between at least one pair of covering layers of polymeric material.

In more detail, the Applicant has found that the covering layer of foamed polymeric material of said protective structure proves particularly effective, thus efficiently performing the function of absorbing the energy produced by an accidental impact and/or of withstanding a given force of compression acting on the cable, when said layer of foamed polymeric material is supported by a sufficiently rigid structural element possessed by said cable.

In other words, the Applicant has found that said covering layer of foamed polymeric material performs the aforesaid functions to the best of its capabilities when, in a position radially internal to said layer, and in a condition of mutual contact with the latter, a protective covering layer is provided that is sufficiently rigid and capable of mechanically supporting said layer of expanded material.

Therefore, according to a first aspect, the present invention relates to an optical cable comprising:
   at least one element for the transmission of optical signals, and
   a structure for protecting said at least one element, said structure being arranged in a position radially external to said at least one element,
   characterized in that said structure is a multilayer structure comprising:
      at least one first covering layer of polymeric material in a position radially external to said at least one element;
      at least one covering layer of foamed polymeric material in a position radially external to said at least one first covering layer, and
      at least one second covering layer of polymeric material in a position radially external to said at least one covering layer of foamed polymeric material,
      said foamed polymeric material having a density between 0.3 and 0.7 kg/dm$^3$ and a tensile modulus at 20° C. between 300 and 700 MPa.

Preferably, the covering layer of foamed polymeric material is in a condition of mutual contact with said at least one first covering layer so as best to perform its function of absorbing the energy deriving from an action of impact and/or of compression from an external force acting upon said cable.

In a preferred embodiment, the present invention relates to an optical cable comprising:
   an optical core provided with at least one optical fiber;
   at least one first covering layer of polymeric material in a position radially external to said optical core;
   at least one covering layer of foamed polymeric material in a position radially external to said at least one first covering layer, and
   at least one second covering layer of polymeric material in a position radially external to said at least one covering layer of foamed polymeric material,
   said foamed polymeric material having a density between 0.3 and 0.7 kg/dm$^3$ and a tensile modulus at 20° C. between 300 and 700 MPa.

In accordance with said embodiment, preferably the covering layer of foamed polymeric material is in a condition of mutual contact with said at least one first covering layer.

Preferably, the covering layer of foamed polymeric material is in a condition of mutual contact with said at least one second covering layer.

Preferably, the optical cable according to the present invention, in a position radially external to the optical core possessed by said cable, has at least one reinforcing layer that is resistant to tension, for example of the aramidic type, that is able to endow said cable with suitable tensile strength.

Furthermore, the Applicant has found that it is possible to achieve high impact strength and/or compressive strength by providing a multilayer protective structure comprising at least one intermediate covering layer interposed between at least one pair of additional covering layers, respectively a layer radially internal to and a layer radially external to said intermediate layer, the latter possessing a tensile modulus lower than that possessed by said pair of additional layers.

Therefore, in a second aspect, the present invention relates to a multilayer protective structure for the protection of at least one element for the transmission of optical signals, said multilayer structure, arranged in a position radially external to said at least one element, comprising:
   at least one first covering layer of polymeric material in a position radially external to said at least one element;
   at least one covering layer of foamed polymeric material in a position radially external to said at least one first covering layer, and
   at least one second covering layer of polymeric material in a position radially external to said at least one covering layer of foamed polymeric material,
   said foamed polymeric material having a tensile modulus lower than the tensile modulus of said at least one first covering layer and at least one second covering layer.

Preferably, said foamed polymeric material has a density between 0.3 and 0.7 kg/dm$^3$ and a tensile modulus at 20° C. between 300 and 700 MPa.

In a third aspect, the present invention relates to a method of mechanically protecting at least one element for the transmission of optical signals possessed by an optical cable, said method comprising the step of arranging a multilayer structure in a position radially external to said at least one element, said multilayer structure comprising at least one covering layer of foamed polymeric material interposed between at least one pair of covering layers of polymeric material, said foamed polymeric material having a tensile modulus lower than the tensile modulus of said at least one pair of covering layers.

Preferably, said foamed polymeric material has a density between 0.3 and 0.7 kg/dm$^3$ and a tensile modulus at 20° C. between 300 and 700 MPa.

BRIEF DESCRIPTION OF THE DRAWINGS

Said description, given below, refers to the appended drawings, supplied purely for explanation and without any limiting intent, in which.

DETAILED DESCRIPTION OF THE INVENTION

For simplicity of description, in the appended drawings, the same reference signs correspond to similar or identical components.

Figure 1:
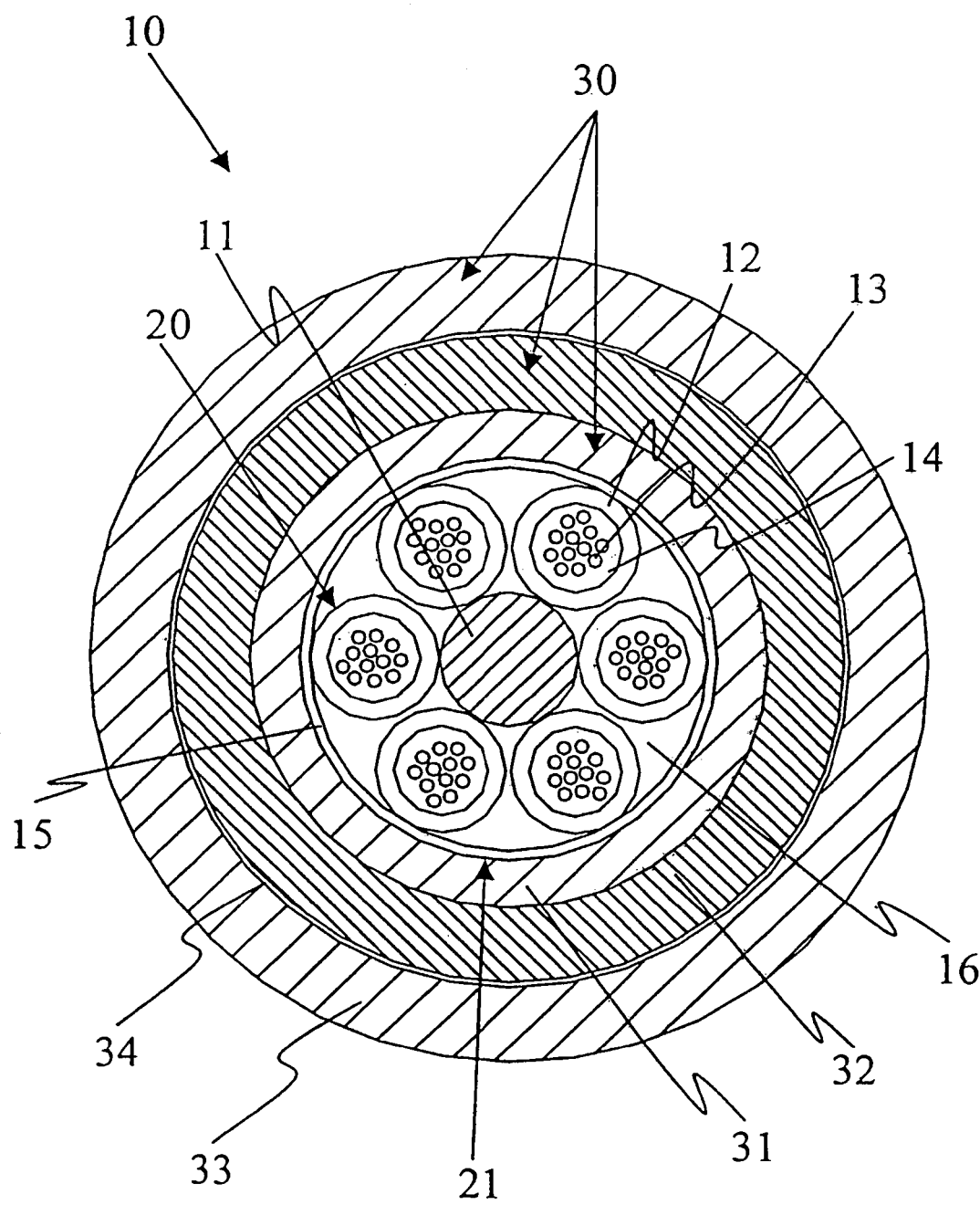
FIG. 1 shows, in right cross section, a first embodiment of the optical cable according to the invention.

An optical cable 10 for telecommunications and/or for data transmission according to the present invention is shown in right cross section in FIG. 1.

In accordance with the embodiment shown, said optical cable 10 comprises, in the radially innermost position, a central reinforcing element 11 around which one or more tubular elements 12 are provided, within which at least one optical fiber 13 is housed.

Preferably said tubular elements 12 are made of polyethylene (PE), polypropylene (PP) or polybutylene terephthalate (PBT).

Preferably said central reinforcing element 11 is made of a dielectric material such as plastic reinforced with fiberglass, aramidic yarns (for example Kevlar®) combined with a resin, or reinforcing yarns in general embedded in a usual matrix of thermoplastic or crosslinked polymeric material.

Generally, within said tubular elements 12, said optical fibers 13 are immersed in a buffering filler (a jelly-like material) 14 which performs the function of blocking any longitudinal propagation of water following accidental damage of the cable.

The material used as the buffering filler is usually a composition based on an oil of the silicone type, mineral oil (naphthenic or paraffinic) or synthetic oil, to which a viscosity index agent is added, for example an elastomeric polymer having a low glass transition temperature (for example polyisobutylene), and, if necessary, a thickener or an agent for making it thixotropic (for example pyrogenic silica), as well as an antioxidant. It is preferable to use buffering agents based on hydrocarbons or that are in any case compatible with the polyolefinic materials forming the tubular elements, where said materials are used.

If required, the buffering filler can also perform the function of absorber of hydrogen. In that case a filler is dispersed in it, for example palladium-coated carbon, that is able to absorb hydrogen.

In the embodiment shown in FIG. 1, the assembly comprising a tubular element 12, in which one or more optical fibers 13 are contained, forms an element 20 for the transmission of optical signals as defined above.

FIG. 1 shows six elements 20 for the transmission of optical signals distributed around said central reinforcing element 11 and held in position by binding and taping 15 for containment.

Advantageously, said taping 15 consists of one or more windings of tapes typically based on polyesters performing both mechanical functions and functions of thermal insulation.

Preferably, said tapes are also of the waterswellable type, i.e they are able to swell when they come into contact with water so as to obstruct the longitudinal flow of water inside the cable.

Optionally, a metallic screen, for example of aluminium, is arranged in a position radially external to said taping 15. In general, said screen is used as a barrier to the propagation of moisture in the radial direction and generally has a thickness of between 0.15 and 0.2 mm.

As an alternative to the use of waterswellable screening tapes, in a manner similar to that described for filling the tubular elements containing the optical fibers, the aforesaid tubular elements 12 can also be immersed in a suitable buffering filler 16.

Preferably, said tubular elements 12 are stranded together around said central reinforcing element 11 according to a helical configuration with a predetermined pitch, either continuously or, preferably, alternating (of the S-Z type).

In accordance with the embodiment shown in FIG. 1, the assembly comprising said elements 20 for the transmission of optical signals arranged around said central reinforcing element 11 and held in place by said containment taping 15 forms the so-called optical core 21 of the optical cable 10 as defined above.

Figure 2:
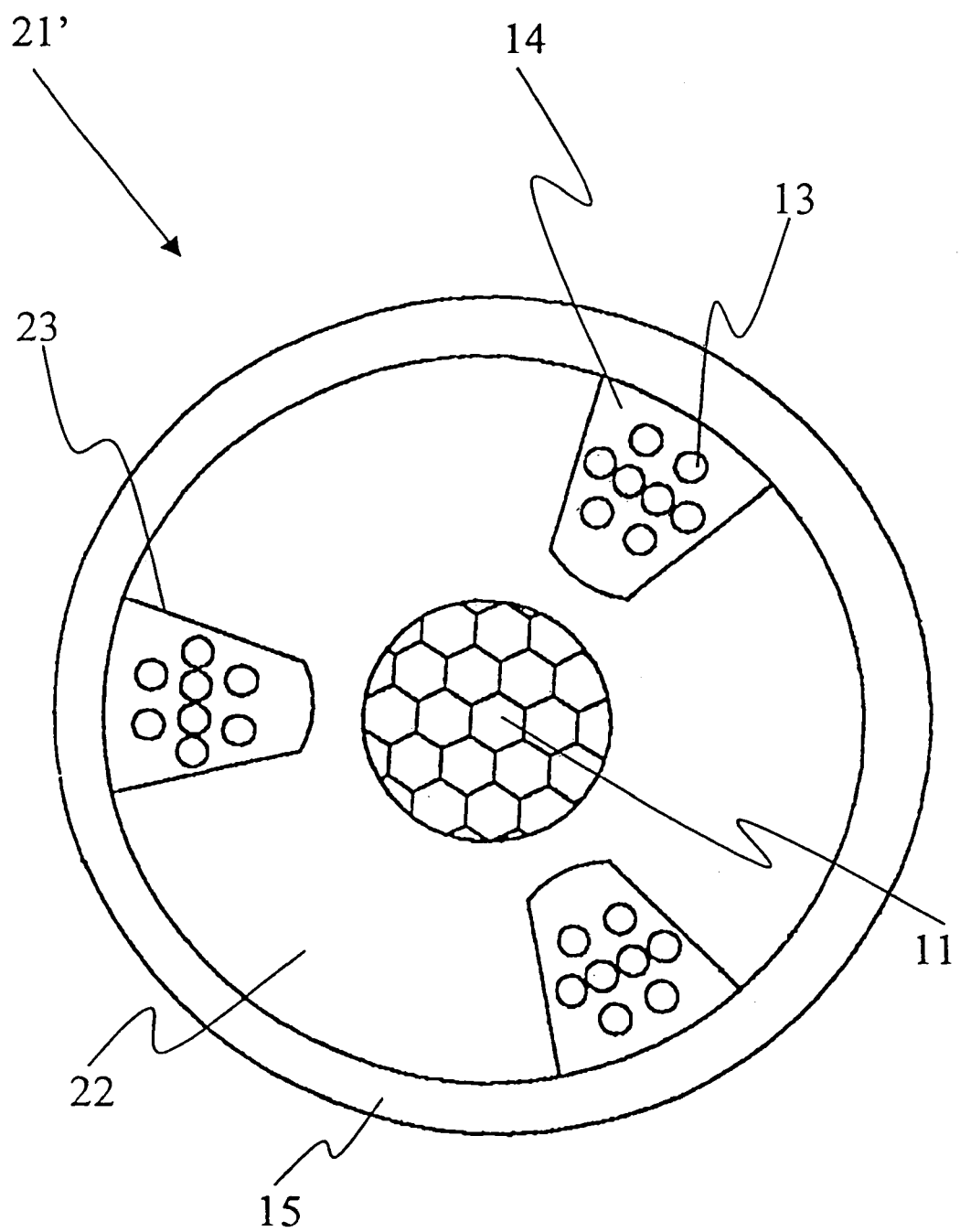
FIGS. 2 and 3 show, in right cross section, two different embodiments of an optical core.

A further type of optical core 21' is, for example, shown in FIG. 2 and comprises a central reinforcing element 11, in the radially innermost position, around which a rigid body 22, provided with a plurality of grooves 23, is extruded.

Said grooves 23 are made in radially external portions of said rigid body 22 and extend longitudinally, along the external surface of said body, according to a continuous helical configuration or with a configuration of the S-Z type.

Said grooves 23 are filled with a buffering material 14 of the type described above and are intended to accommodate at least one optical fiber 13.

In a position radially external to said rigid body 22, the grooved core 21' has, in addition, a containment taping 15 of the type described above with reference to FIG. 1.

Figure 3:
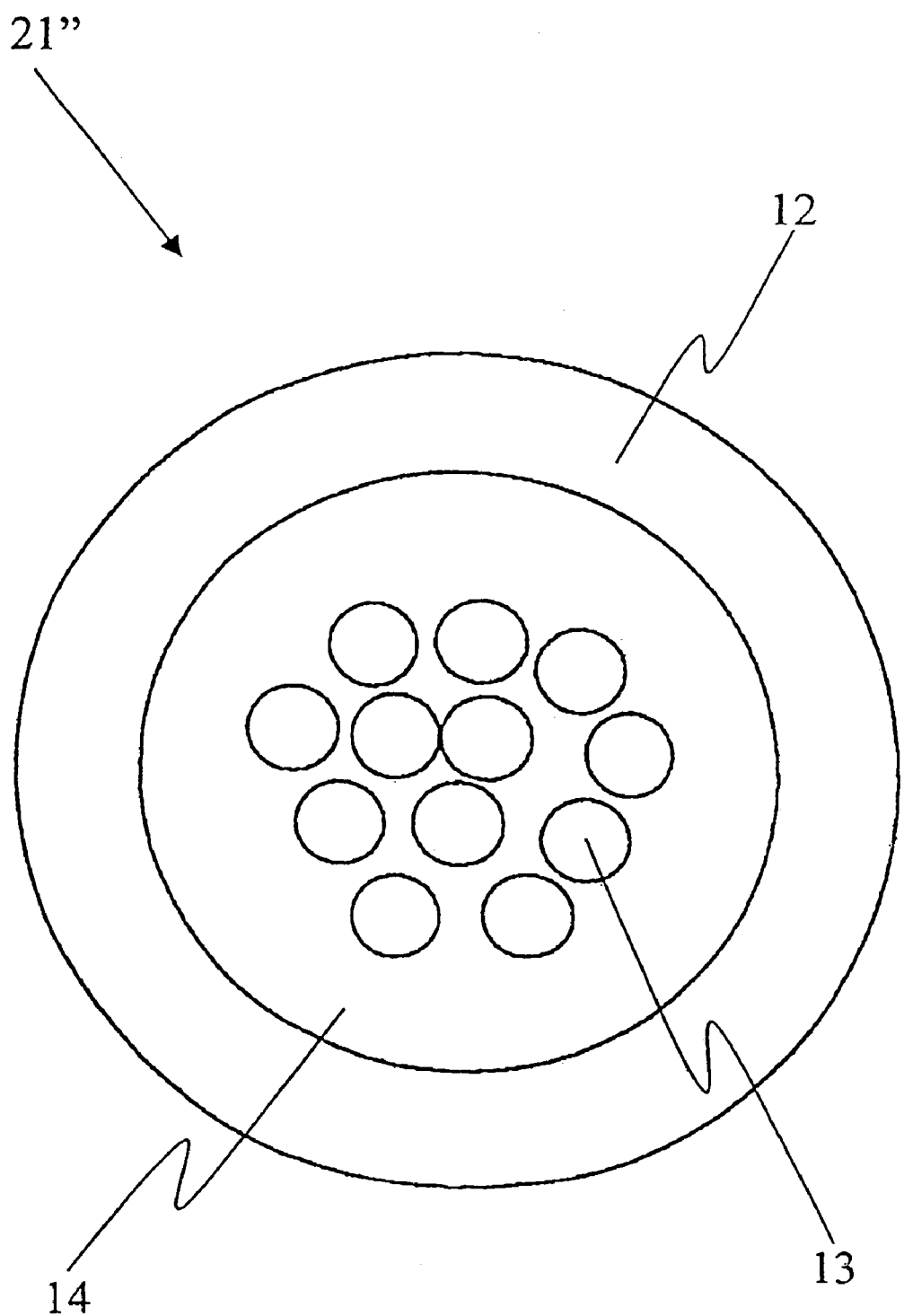

FIG. 3 shows, in right cross section, a further type of optical core 21" comprising a single tubular element 12 containing at least one optical fiber 13, preferably arranged loosely immersed in a buffering material 14 of the type described above.

With reference to the embodiment shown in FIG. 1, the optical cable 10 according to the present invention comprises a multilayer protective structure 30 arranged in a position radially external to said optical core 21.

In more detail, moving radially from the interior to the exterior, said multilayer protective structure 30 comprises: a first covering layer 31 of polymeric material, a covering layer 32 of foamed polymeric material and a second covering layer 33 of polymeric material.

In the following of the present description and in the claims that follow, the term "foamed polymeric material" means a polymeric material with a predetermined percentage of "free" space within the material, i.e. space not occupied by the polymeric material, but by gas or air.

In general, this percentage of free space in a foamed polymeric material is expressed by the so-called "degree of expansion" (G), defined as follows:

$$G=(d_0/d_e-1)*100 \qquad (1)$$

where $d_0$ denotes the density of the unexpanded polymer and $d_e$ denotes the apparent density measured on the expanded polymer (the final density).

In accordance with the present invention, the expandable polymeric material can be selected from the group comprising: polyolefins, copolymers of various olefins, copolymers of olefins with unsaturated esters, polyesters, polycarbonates, polysulphones, phenolic resins, urea resins, and mixtures thereof. Examples of preferred polymers are: polyethylene (PE), especially low-density PE (LDPE), medium-density PE (MDPE), high-density PE (HDPE) and linear low-density PE (LLDPE); polypropylene (PP); elastomeric ethylene-propylene copolymers (EPR) or ethylene-propylene-diene terpolymers (EPDM); natural rubber; butyl rubber; ethylene/vinyl ester copolymers, for example ethylene/vinyl acetate (EVA); ethylene/acrylate copolymers, especially ethylene/methylacrylate (EMA), ethylene/ethylacrylate (EEA), ethylene/butylacrylate (EBA); ethylene/α-olefin thermoplastic copolymers; polystyrene; acrylonitrile-butadiene-styrene (ABS) resins; halogenated polymers, especially polyvinyl chloride (PVC); polyurethane (PUR); polyamides; aromatic polyesters, such as polyethylene-terephthalate (PET) or polybutyleneterephthalate (PBT); and copolymers or mechanical mixtures thereof.

Preferably, the polymeric material is a polyolefinic polymer or copolymer based on ethylene and/or propylene, and in particular is selected from:

(a) copolymers of ethylene with an ethylenically unsaturated ester, for example vinyl acetate or butyl acetate, in which the amount of unsaturated ester is generally between. 5 and 80 wt. %, preferably between 10 and 50 wt. %;
(b) elastomeric copolymers of ethylene with at least one $C_3$-$C_{12}$ α-olefin, and optionally a diene, preferably ethylene-propylene (EPR) or ethylene-propylene-diene (EPDM) copolymers, preferably having the following composition: 35-90 mol. % of ethylene, 10-65 mol. % of α-olefin, 0-10 mol. % of diene (for example 1,4-hexadiene or 5-ethylidene-2-norbornene);
(c) copolymers of ethylene with at least one $C_4$-$C_{12}$ α-olefin, preferably 1-hexene, 1-octene and the like, and optionally a diene, generally having a density between 0.86 and 0.90 g/cm$^3$ and the following composition: 75-97 mol. % of ethylene, 3-25 mol. % of α-olefin, 0-5 mol. % of a diene;
(d) polypropylene modified with ethylene/$C_3$-$C_{12}$ α-olefin copolymers, where the weight ratio between polypropylene and the ethylene/$C_3$-$C_{12}$ α-olefin copolymer is between 90/10 and 30/70, preferably between 50/50 and 30/70.

For example, class (a) includes the commercial products Elvax® (Du Pont), Levapren® (Bayer), Lotryl® (Elf-Atochem); class (b) includes the products Dutral® (Enichem) or Nordel® (Dow-Du Pont); class (c) includes the products Engage® (Dow-Du Pont) or Exact® (Exxon), whereas polypropylene modified with ethylene/α-olefin copolymers are commercially available with the tradenames Moplen® or Hifax® (Basell), or Fina-Pro® (Fina), and the like.

Particularly preferred, in class (d), are the thermoplastic elastomers comprising a continuous matrix of a thermoplastic polymer, for example polypropylene, and small particles (generally having a diameter of the order of 1-10 μm) of a vulcanized elastomeric polymer, for example crosslinked EPR or EPDM, dispersed in the thermoplastic matrix. The elastomeric polymer can be incorporated in the thermoplastic matrix in the unvulcanized state and can then be dynamically crosslinked during the process by adding a suitable quantity of a crosslinking agent. Alternatively, the elastomeric polymer can be vulcanized separately and can then be dispersed in the thermoplastic matrix in the form of small particles. Thermoplastic elastomers of this type are described, for example, in documents U.S. Pat. No. 4,104,210 or EP-324,430.

Among the polymeric materials, a high melt strength polypropylene, as described for example in patent U.S. Pat. No. 4,916,198, commercially available under the trademark Profax® (Basell), has become particularly preferred. Said document describes a process for the production of said polypropylene in a step of irradiation of a linear polypropylene carried out by using high-energy ionizing radiation for a period of time sufficient to ensure formation of a large quantity of long branchings of the chain, this step being followed by a suitable treatment of the irradiated material so as to deactivate the free radicals present in the irradiated material.

Even more preferably, particularly favoured among the polymeric materials is a polymeric composition comprising the aforesaid polypropylene with high branching index, generally in an amount between 30 and 70 wt. %, mixed with a thermoplastic elastomer of the type belonging to class (d) as above, in an amount generally between 30 and 70 wt. %, said percentages being expressed relative to the total weight of the polymer composition.

In accordance with the present invention, the expansion degree of the polymeric material of said covering layer 32 of foamed polymeric material can vary from 20% to 250%, and preferably from 50% to 150%.

The foamed polymeric material of the covering layer 32 of said multilayer protective structure 30 according to the present invention, in order to guarantee optimum results in terms of impact and/or compressive strength, should possess a density (i.e. the final density $d_e$ of formula (1) above) between 0.3 and 0.7 kg/dm$^3$, preferably between 0.4 and 0.6 kg/dm$^3$.

In addition, preferably, said foamed polymeric material of covering layer 32 has a tensile modulus at 20° C. between 300 and 700 MPa, preferably between 400 and 600 MPa.

The starting expandable polymeric material, selected from the group as given above, has a density (i.e. the density $d_o$ of formula (1) as above) between 0.85 and 1.10 kg/dm$^3$.

Furthermore, said starting expandable polymeric material has a tensile modulus at 20° C. between 700 and 1100 MPa.

In general, the covering layer 32 made of foamed polymeric material has a thickness between 0.5 and 3.0 mm, preferably between 1.0 and 2.5 mm.

Generally, the aforesaid first covering layer 31 and second covering layer 33 of said multilayer protective structure 30 according to the invention are made from the same polymeric material.

Preferably said polymeric material is selected from the group comprising: low-density polyethylene (LDPE) (d=0.910–0.925 g/cm$^3$); medium-density polyethylene (MDPE) (d=0.926–0.940 g/cm$^3$); high-density polyethylene (HDPE) (d=0.941–0.965 g/cm$^3$); copolymers of ethylene with α-olefins; polypropylene (PP); ethylene/α-olefin rubbers, in particular ethylene/propylene rubbers (EPR), ethylene/propylene/diene rubbers (EPDM); natural rubber; butyl rubbers; and mixtures thereof.

The copolymers obtainable by copolymerization of ethylene with at least one α-olefin having from 3 to 12 carbon atoms, and possibly with a diene, in the presence of a "single-site" catalyst, in particular a metallocene catalyst or a Constrained Geometry Catalyst, are particularly preferred.

Other conventional components, such as antioxidants, processing co-adjuvants, lubricants, pigments, other fillers, and the like, can be added to the aforesaid polymeric material. Conventional antioxidants suitable for the purpose are, for example: polymerized trimethyldihydroquinoline, 4,4'-thiobis(3-methyl-6-tert-butyl)phenol; pentaerythrylteta[3-(3,5-ditert-butyl-4-hydroxyphenyl)propionate], 2,2'-thiodiethylene-bis[3-(3,5)-ditert-butyl-4-hydroxyphenyl) propionate], and the like, or mixtures thereof.

In a particular embodiment, said first covering layer 31 and second covering layer 33 of said multilayer protective structure 30 according to the invention are made of dissimilar materials.

For example, in particular fields of application it is appropriate that said second covering layer 33 should be, advantageously, a covering of the flameproof type.

Preferably the second covering layer 33 is thicker than the first covering layer 31.

Generally, the first covering layer 31 made of polymeric material has a thickness between 0.5 and 2.0 mm, preferably between 0.7 and 1.5 mm.

Generally, the second covering layer 33 made of polymeric material has a thickness between 0.5 and 3.0 mm, preferably between 0.9 and 2.0 mm.

According to the embodiment shown in FIG. 1, the optical cable 10 according to the present invention further comprises a reinforcing layer 34 of the dielectric type that is able to endow said cable with a suitable tensile strength, which is particularly desirable especially during cable laying.

Preferably said reinforcing layer 34 is made of aramidic yarns and/or glass-fiber yarns. Optionally said reinforcing layer 34 is made of carbon-fiber yarns or of yarns based on polyester or polypropylene.

Preferably said reinforcing layer 34 is arranged in a position radially external to said covering layer 32 of foamed polymeric material, in a state of mutual contact with the latter.

For applications of the terrestrial type, preferably said reinforcing layer 34 has a thickness between 0.2 and 0.6 mm, said thickness depending on the number of yarns used. However, it should be emphasized that in the case of overhead cables said thickness can also be greater, since a larger number of yarns is generally used.

Figure 4:
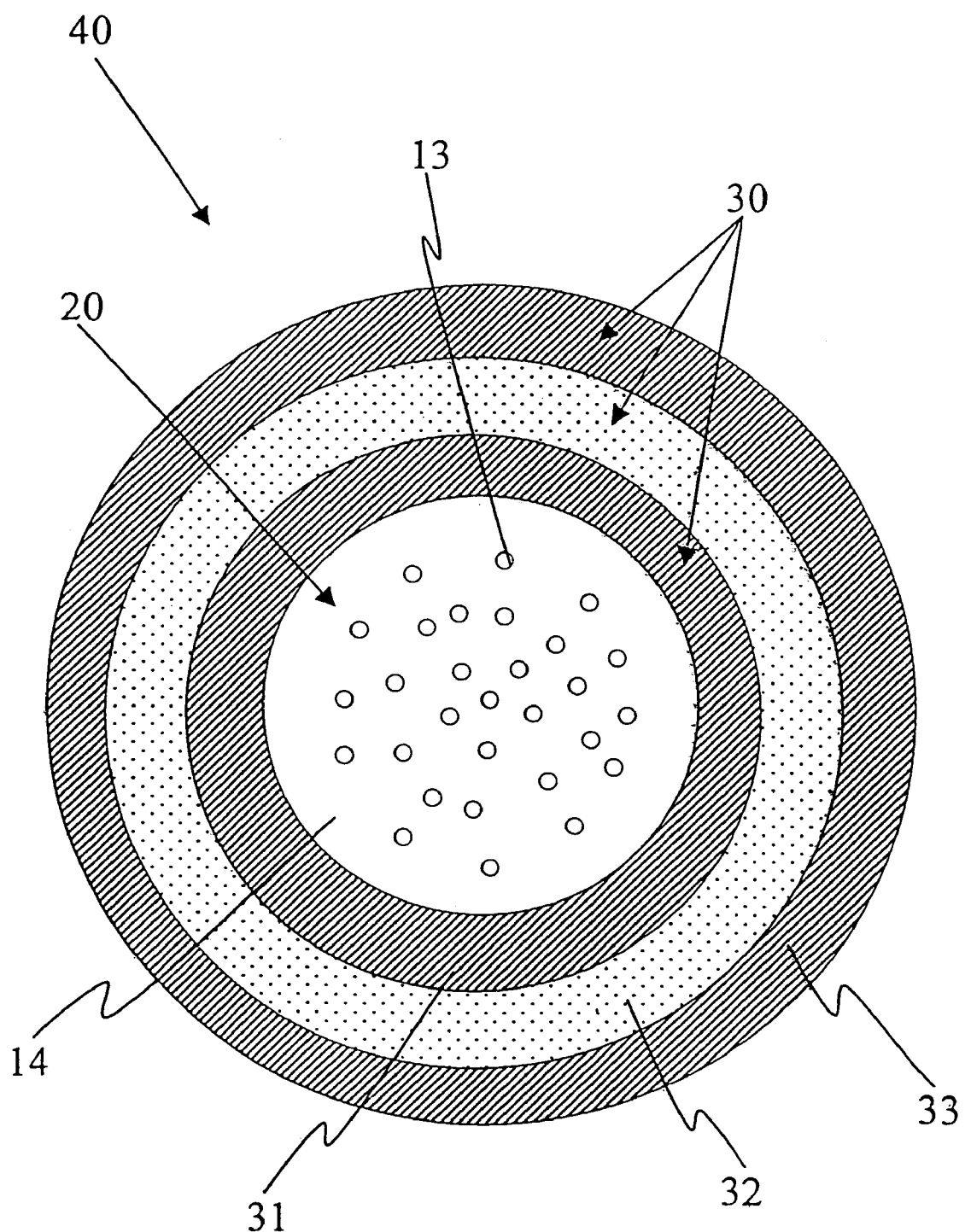
FIGS. 4 and 5 show, in right cross section, two different embodiments of the optical cable according to the invention.

FIG. 4 shows, in right cross section, a further embodiment of an optical cable 40 comprising a multilayer protective structure 30 according to the present invention.

In detail, according to the embodiment shown in FIG. 4, the element 20 for the transmission of optical signals, as defined above, possessed by said optical cable 40 is represented by a plurality of optical fibers 13, immersed in a buffering filler 14.

Therefore, in accordance with the aforesaid embodiment, the first covering layer 31 of said multilayer protective structure 30 also constitutes the structure for containment of said optical fibers immersed in said buffering filler.

Figure 5:
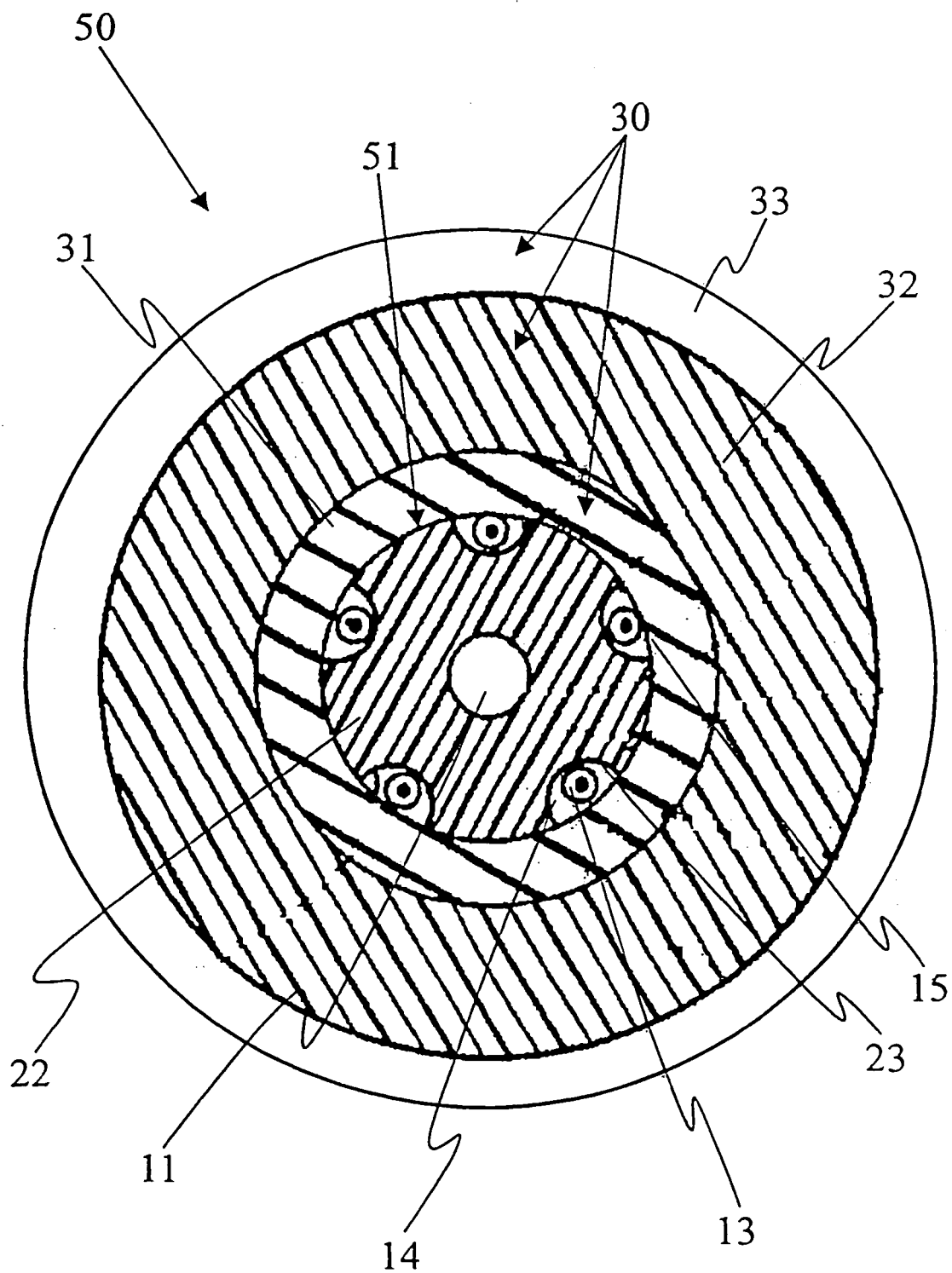

FIG. 5 shows, in right cross section, a further embodiment of an optical cable 50 comprising a multilayer protective structure 30 according to the present invention.

In more detail, the optical cable 50 comprises an optical core 51 of the grooved type (similar to that shown in FIG. 2), in a position radially external to which said multilayer protective structure 30 is arranged.

With regard to the process for manufacturing an optical cable according to the present invention, the main steps characterizing the aforesaid process, in the case an optical cable of the type shown in FIG. 1 has to be produced, are described hereinbelow.

The optical core 21 of said optical cable is obtained in accordance with conventional techniques and so it will not be described in detail.

The optical core 21, wound on a reel, is fed to a first extrusion line for extruding onto said optical core 21 the aforesaid first covering layer 31 of polymeric material of the multilayer protective structure 30 according to the invention.

Downstream from said first extrusion, the optical core 21 covered with said first covering layer 31 is submitted to a cooling cycle. Preferably said cooling is effected by moving the whole optical core and first covering layer inside a cooling channel in which a suitable fluid is located, typically water at a predetermined temperature, usually between 10 and 25° C., depending both on the length of the cooling channel and on the linear speed of the line itself.

Once cooled, said whole is collected on a storage reel.

The manufacturing process of the optical cable then envisages a second extrusion step for placing the covering layer 32 of foamed polymeric material in a position radially external to said first polymeric covering layer 31.

In accordance with document WO 98/52197 cited above, the expansion step of the polymeric material constituting said covering layer 32 is effected during the extrusion operation.

This expansion can take place either chemically, by addition during the preparation step of the polymer composition of a suitable expanding agent able to produce a gas in suitable pressure and temperature conditions, or physically, by injecting gas at high pressure directly into the extruder barrel. Examples of suitable expanding agents are: azodicarbamide, paratoluenesulphonylhydrazide, mixtures of organic acids (for example citric acid) with carbonates and/or bicarbonates (for example sodium bicarbonate), and the like. Examples of gases that can be injected at high pressure into the extruder barrel are: nitrogen, carbon dioxide, air, low-boiling hydrocarbons (for example propane or butane), halogenated hydrocarbons (for example methylene chloride, trichlorofluoromethane, 1-chloro-1,1-difluoroethane and the like), or their mixtures.

It has been observed that, for identical extrusion conditions (such as rotation speed of the screw, speed of the extrusion line, diameter of the extruder head), one of the process variables having a major influence on the expansion degree is the extrusion temperature. In general, for extrusion temperatures below 130° C. it is difficult to obtain a sufficient expansion degree; the extrusion temperature is preferably at least 140° C., and especially about 180° C. Generally, an increase in extrusion temperature corresponds to a higher expansion degree.

Furthermore, to some extent it is possible to control the expansion degree of the polymer by acting on the cooling rate. Thus, by suitably delaying or anticipating the cooling of the polymer that forms the expanded covering layer at the extruder exit, it is possible to increase or decrease the expansion degree of said polymeric material.

Downstream from the second extrusion step, the optical core, thus covered, is submitted to a suitable cooling cycle, as mentioned above, and wound onto a further storage reel.

Next, the manufacturing process of the optical cable envisages that, in a position radially external to the foamed polymric covering layer 32, a reinforcing layer 34 (if envisaged, for example yarns of Kevlar®) is placed in a well-known manner and then, in a further extrusion step, the second covering layer 33 of polymeric material of said multilayer protective structure 30 is applied.

Preferably, said reinforcing layer 34 and said second covering layer 33 are applied on the same line.

Once again, downstream from said further extrusion step, the optical cable thus made up is cooled and collected on a reel.

The production process as described above envisages, as mentioned, several successive extrusion steps. Advantageously said process can be carried out in a single pass, for example by a "tandem" technique, by using several separate extruders arranged in series. As a further alternative, said process can also be carried out by co-extrusion by using a single extrusion head.

If an optical cable different from that shown in FIG. 1 has to be produced, for example an optical cable of the type shown in FIGS. 4 and 5, the production process described above can be appropriately modified on the basis of the instructions supplied and of the technical knowledge possessed by an average person skilled in the art.

For further description of the invention, some illustrative examples are supplied below.

EXAMPLE 1

The manufacture of an optical cable for telecommunications and/or for data transmission was undertaken in accordance with the design of FIG. 1.

The optical core of said cable comprised a central reinforcing member of plastic reinforced with fiberglass, with a tensile modulus at 20° C. equal to 50,000 MPa. The diameter of said central member was 2.7 mm.

Said optical core comprised, moreover, 6 tubular elements, each of which contained 12 optical fibers immersed in a hydrocarbon-based buffering filler (jelly). Each tubular element had an inside diameter of 1.8 mm and an outside diameter of 2.5 mm. Said tubular elements were stranded together according to an open helical configuration obtained by executing, alternately, 8 left-handed turns (i.e., type S) and 8 right-handed turns (i.e., type Z). Said helix had an average pitch of 85 mm. Said stranding was accomplished by using a conventional, polypropylene-based binding yarn.

Said core was completed with a taping of the aforesaid tubular elements, carried out with a polyester-based tape including a water swellable powder that is able to block, as a result of swelling, any water infiltrations towards the interior of the cable. The thickness of said taping was about 0.4 mm.

A multilayer protective structure according to the invention, comprising respectively, moving radially towards the outside of the cable: a) a first covering layer of polyethylene; b) a covering layer of foamed polymeric material; c) a reinforcing layer of the aramidic type; d) a second covering layer of polyethylene, was provided in a position radially external to the optical core thus obtained.

In detail, said first covering layer and said second covering layer were made of low-density polyethylene, having a tensile modulus at 20° C. between 800 and 1,400 MPa. The thickness of said first covering layer was 1 mm, whereas the thickness of said second covering layer was 1.5 mm.

The covering layer of foamed polymeric material was obtained by using, as the polymeric basis material, HIGRAN SD 817® (high melt strength polypropylene manufactured by Basell). The thickness of said covering layer of foamed polymeric material was 1.5 mm.

Expansion of said covering layer was effected chemically, by adding, in the extruder hopper, 1.5 wt. % (relative to the total) of expanding agent Hydrocerol® CF 70 (carboxylic acid/sodium bicarbonate), made by Boehringer Ingelheim.

The expanded covering layer had a final density of 0.4 kg/dm$^3$ and an expansion degree of about 130%.

The reinforcing layer of the aramidic type as above was obtained by providing a first layer comprising fifteen yarns of Twaron 2200® stranded according to a configuration of the S type, and a second layer, superposed to the first layer, comprising fifteen yarns of Twaron 2200® stranded according to a configuration of the Z type. Said yarns had a count (linear density) equal to 1,620 dTex (dTex indicates the weight in grams of 10,000 m of yarn). The total number of aramidic yarns used was equal to 36 and the thickness of the resulting layer of yarns was equal to 0.15 mm.

Table 1 summarizes the design details of the cable described above, as well as the design details of the cables described in the following comparative examples, together with the results of the tests carried out on said cables.

The optical cable thus obtained was tested for impact strength and for compressive strength, as defined hereinbelow with reference to international standard IEC 794-1 with respect to the conditions for conducting the tests.

Test for Determination of Impact Strength

The impact test consisted of dropping, from a fixed height of 1 m, a striker of a predetermined weight, and of spherical shape with a curvature radius of 10 mm. The use of a reduced curvature radius of the striking surface, in fact, made it possible to achieve transfer of the impact energy onto a particularly restricted area of the specimen, leading to an increased severity of the test.

For determining the impact strength, a plurality of successive impact tests was effected on a cable sample by using strikers having gradually increasing weight. The impact tests were carried out on the same specimen, but at different points thereof, so as to avoid striking two or more times at the same point.

At the end of each impact, an assessment of the damage was undertaken both by a visual examination of the outermost covering layer (i.e., the second polymeric covering layer of the multilayer protective structure according to the invention) of the cable at the impact point, and by verification of the transmission capacity of the optical fibers, contained in said cable, immediately after impact.

The transmission capacity of the optical cable was evaluated by monitoring all the optical fibers connected in a "loop", i.e. by connecting said fibers in series and checking for any change in the attenuation of the transmitted optical signal due to the impact.

The test was stopped when a damage of the cable outer covering layer was detected and/or when a minimal temporary attenuation of the optical signal transmitted by said cable was detected.

With reference to the optical cable described above, said cable displayed a considerable impact strength, withstanding energies of the order of 40 J. In other words, the optical cable as above did not show superficial damage and/or attenuation of the optical signal, even temporary, for impact energy values less than or equal to 40 J.

Test for Determination of Compressive Strength

This compressive test consisted in applying for a predetermined period of time, of about fifteen minutes, a compressive force in a direction perpendicular to the external surface of a sample of the optical cable as above.

In more detail, said compressive force was applied to the cable sample indirectly, i.e. by interposing a steel block of predefined dimensions (length equal to 100 mm) in accordance with standard IEC 794-1.

The test consisted in verifying the transmission capacity of the optical cable for the period of fifteen minutes of application of the compressive force. The transmission capacity was verified in a manner similar to that described in the impact test. The test was repeated several times on the cable sample by varying the intensity of the applied compressive force, and was considered to be completed when, during the application of said force, a decrease, even minimal, in the optical signal transmitted by said cable during the application of the load was measured.

Furthermore, the test consisted in the visual examination of the damage of the cable outermost covering layer at the application point of the compressive force.

With reference to the optical cable described above, the latter displayed a considerable compressive strength withstanding values of compression of the order of 4 kN. In other words, the optical cable as above did not show any attenuation of the optical signal, even temporary, for compressive forces less than or equal to 4 kN.

EXAMPLE 2 (COMPARATIVE)

Manufacture of an optical cable was undertaken, provided with the same optical core as in Example 1, in a position radially external to which the following layers were respectively arranged: a) a layer of foamed polymeric material; b) a reinforcing layer of the aramidic type; c) an outer covering layer of polyethylene.

In detail, said layer of foamed polymeric material was obtained by using the same composition as in Example 1 and the expansion was effected chemically by adding, in the extruder hopper, 1.3 wt. % (relative to the total) of the expanding agent Hydrocerol® BIH-40. The layer of foamed polymeric material had a final density of 0.5 kg/dm$^3$, an expansion degree of about 85% and a thickness of 1 mm.

The reinforcing layer of the aramidic type was the same as in Example 1 and the polyethylene covering layer, identical to that of Example 1, had a thickness of 1.5 mm.

Similarly Example 1, the optical cable thus obtained was submitted to an impact test and to a compressive test.

In detail, the optical cable was able to withstand an impact energy of the order of 20 J and a compressive force of the order of 2.5 kN, without showing, at those values, changes in attenuation, even temporary.

EXAMPLE 3 (COMPARATIVE)

Manufacture of the same optical cable as in Example 2 was undertaken, with the sole difference that the layer of foamed polymeric material, obtained by using the same composition as in Example 1, had a final density equal to 0.4 kg/dm$^3$ (the expansion was effected chemically by adding, in the extruder hopper, 1.7 wt. %, relative to the total, of the expanding agent Hydrocerol® BIH-40), an expansion degree of about 130% and a thickness of 1.9 mm.

The optical cable thus obtained was able to withstand an impact energy of about 25 J and a compressive force of about 2.5 kN, without showing, at those values, changes in attenuation, even temporary.

EXAMPLE 4 (COMPARATIVE)

The same optical cable as in Example 3 was manufactured, with the sole difference that the layer of foamed polymeric material had a final density of 0.5 kg/dm$^3$ and an expansion degree of 85%.

The optical cable thus obtained was able to withstand an impact energy of about 30 J and a compressive force of about 3 kN.

EXAMPLE 5 (COMPARATIVE)

Manufacture of the same optical cable as in Example 4 was undertaken, with the sole difference that the layer of foamed polymeric material had a thickness of 2.5 mm.

The optical cable thus obtained was able to withstand an impact energy of about 35 J and a compressive force of about 3.25 kN.

EXAMPLE 6 (COMPARATIVE)

Manufacture of an optical cable provided with the same optical core as in Example 1 was undertaken. In a position radially external to said optical core, the 30 following layers have been respectively provided: a) a covering layer of polyethylene, and b) an outer layer of foamed polymeric material.

In detail, the layer of foamed polymeric material had the same characteristics as that of Example 1 (final density equal to 0.4 kg/dm$^3$, expansion degree of about 130%, thickness of 1.5 mm), whereas the covering layer of polyethylene, identical to that of Example 1, had a thickness of 1 mm.

The optical cable thus obtained withstood an impact energy of about 10 J and a compressive force of about 3.25 kN.

EXAMPLE 7 (COMPARATIVE)

The manufacture of an optical cable provided with the same optical core as in Example 1 was undertaken, providing respectively the following layers in a position radially external to the latter: a) a first covering layer of polyethylene; b) a second covering layer of polyethylene; c) a reinforcing layer of the aramidic type; d) a third outer covering layer of polyethylene.

In detail, the aforesaid covering layers of polyethylene were obtained by using the same material described in Example 1 and had, respectively, a thickness of 1 mm for the first covering layer, 1.5 mm for the second covering layer and 1.5 mm for the third covering layer.

The reinforcing layer of the aramidic type was the same as that of Example 1.

The optical cable thus obtained withstood an impact energy of about 30 J and a compressive force of about 4 kN.

EXAMPLE 8 (COMPARATIVE)

Manufacture of an optical cable provided with the same optical core as in Example 1 was undertaken, providing respectively the following layers in a position radially external to said optical core: a) a first covering layer of polyethylene; b) a reinforcing layer of aramidic yarns; c) a conventional metallic armour; d) a second outer covering layer of polyethylene.

In detail, the aforesaid covering layers of polyethylene were obtained by using the same material described in Example 1 and had, respectively, a thickness of 1 mm for the first covering layer and a thickness of 1.5 mm for the second covering layer.

The reinforcing layer of the aramidic type was the same as that of Example 1.

The metallic armour consisted in a steel strip plated on both sides, of thickness on the steel equal to 0.15 mm, formed into a tube on the cable after first being corrugated and then heat-welded longitudinally with an overlap of approx. 7 mm.

The optical cable thus obtained withstood an impact energy of about 20 J and a compressive force of about 4.25 kN.

For greater clarity of description, the results of the tests for impact strength and compressive strength relating to the above examples are presented in the following Table 1.

TABLE 1

| Example | Impact strength (J) | Compressive strength (kN) |
| --- | --- | --- |
| No. 1 (PE: 1 mm; foam: 1.5 mm, 0.4 kg/dm$^3$; Kevlar; PE: 1.5 mm) | 40 | 4 |
| No. 2 (foam: 1 mm, 0.5 kg/dm$^3$; Kevlar; PE: 1.5 mm) | 20 | 2.5 |
| No. 3 (foam: 1.9 mm, 0.4 kg/dm$^3$; Kevlar; PE: 1.5 mm) | 25 | 2.5 |

TABLE 1-continued

| Example | Impact strength (J) | Compressive strength (kN) |
|---|---|---|
| No. 4 (foam: 1.9 mm, 0.5 kg/dm$^3$; Kevlar; PE: 1.5 mm) | 30 | 3 |
| No. 5 (foam: 2.5 mm, 0.5 kg/dm$^3$; Kevlar; PE: 1.5 mm) | 35 | 3.25 |
| No. 6 (PE: 1 mm; foam: 1.5 mm, 0.4 kg/dm$^3$) | 10 | 3.25 |
| No. 7 (PE: 1 mm; PE: 1.5 mm; Kevlar; PE: 1.5 mm) | 30 | 4 |
| No. 8 (PE: 1 mm; steel: 0.15 mm; Kevlar; PE: 1.5 mm) | 20 | 4.25 |

The analysis of the tests conducted on the cables as above leads to the following conclusions.

Firstly, the cable configuration described in Example 1 shows high impact strength, greater than that of the comparative cables taken into consideration, as well as high compressive strength, substantially comparable to that of a cable provided with an armour of the metallic type (Example 8).

Furthermore, the placement of a layer of foamed polymeric material, i.e. of low elastic modulus, as the outermost covering layer of an optical cable (Example 6) proved to be a rather inappropriate solution as it does not endow said cable with a significant contribution to impact strength, the latter remaining at very low values (equal to 10 J in Example 6 above).

From the configuration described in Example 2, it can be deduced that, by positioning said layer of foamed polymeric material beneath the outermost covering layer of an optical cable, the impact strength conferred on the latter increases considerably (doubling in value, from 10 J in Example 6 to 20 J in Example 2). This is due essentially to the fact that in Example 2 impact occurs on an outer layer (of polyethylene) with higher elastic modulus relative to the layer of foamed polymeric material. Therefore, since the outer layer is less easily penetratable by the testing striker, the deformation created by the latter is transferred to the underlying layer of foamed polymeric material over a greater area. Thus, this produces a more extensive deformation of said underlying layer which then provides greater absorption of the impact energy, resulting in a less transfer of the latter onto the underlying optical core.

However, though greatly improving the impact strength, the presence of said layer of foamed polymeric material beneath the outer covering layer of polyethylene (Example 2) causes an appreciable decrease in compressive strength compared with the case when said layer of foamed polymeric material is the outermost layer of the cable (Example 6). The Applicant considers that this is due to the fact that the layer of foamed polymeric material of Example 2 is not able to offer sufficient resistance to the compressive force acting on the cable since said layer of foamed polymeric material is not supported by a layer that is sufficiently rigid to support it.

Moreover, by comparing Examples 2, 4 and 5, it can be noted that, with equal final density of the expanded material, an increase in thickness of the layer of foamed polymeric material leads to an advantageous increase both in impact strength and in compressive strength, said increase in thickness providing greater absorption of the energy acting on the cable.

By comparing Examples 1, 5 and 7, it can be noted that, with equal diameter (said examples in fact envisage a thickness of 4 mm on top of the same optical core), the multilayer protective structure according to the invention proves to be particularly advantageous. In fact, said structure, comprising a covering layer with low elastic modulus (i.e. the covering layer of foamed polymeric material) interposed between a pair of covering layers with higher elastic modulus (i.e. the covering layers of polymeric material—polyethylene in the examples), guarantees high impact strength and compressive strength in comparison both with a cable configuration in which the covering layer of foamed polymeric material, though being of large thickness (equal to 2.5 mm in Example 5), is in direct contact with t-he optical core, and with a cable configuration in which the multilayer structure radially external to the optical core comprises materials with higher elastic modulus (Example 7). Furthermore., said last solution also proves to be disadvantageous in terms of overall weight of the optical cable.

Moreover, by comparing Examples 3 and 4 it can be deduced that, at equal thickness, an increase in density (and therefore in elastic modulus) of the covering layer of foamed polymeric material is accompanied by an improvement of about 20% in impact strength (which increases from 25 J to 30 J) and in compressive strength (which increases from 2.5 kN to 3 kN). However, by comparing Examples 7 and 8 it can be noted that an excessive increase in density (and therefore in elastic modulus) of the intermediate covering layer (which is polyethylene in Example 7 and steel in Example 8) causes a considerable decrease in the impact strength of the cable (which decreases from 30 J of Example 7, value which is comparable to that of Example 4, to 20 J of Example 8).

From the foregoing, the multilayer protective structure according to the invention is able to endow the optical cable, with which said structure is combined, both with high impact strength and with high compressive strength thanks to the presence of a covering layer of foamed polymeric material interposed between at least one pair of covering layers of polymeric material.

Thus, as noted above, in order to guarantee an effective protective structure against impact and compression, the intermediate covering layer of said structure has to possess values of final density, and therefore of elastic modulus, lower than those of said pair of covering layers.

Further advantages possessed by the optical cable according to the present invention include moderate weight of the cable itself, as well as greater flexibility of the cable.

Furthermore, the presence of a covering layer of foamed material interposed between a pair of covering layers with higher tensile modulus with respect to that of said covering layer of foamed material guarantees safer operation of the cable-at low service temperatures as it causes less shrinkage of said cable.

Finally, the multilayer protective structure according to the present invention, owing to its lightness, flexibility and mechanical strength, proves to be particularly advantageous for applications of the overhead type as well.

In this last case, in fact, overhead cables can be in the condition to withstand, for example, the impact of pellets fired by hunters, and the multilayer solution according to the present invention proves to be particularly suitable for protecting the optical core against the impact of said pellets.

What is claimed is:

1. An optical cable comprising:
    an optical core having at least one element for the transmission of optical signals; and
    a structure for protecting said at least one element, said structure being arranged in a position radially external to said optical core, said structure being a multilayer structure comprising:
    at least one first covering layer of polymeric material in a position radially external to said optical core;
    at least one covering layer of foamed polymeric material in a position radially external to said at least one first covering layer, wherein said at least one first covering layer is sufficiently rigid to mechanically support said at least one covering layer of foamed polymeric material; and
    at least one second covering layer of polymeric material in a position radially external to said at least one covering layer of foamed polymeric material, said foamed polymeric material having a density between 0.3 and 0.7 kg/dm3 and tensile modulus at 20° C. between 300 and 700 MPa.

2. The optical cable according to claim 1, wherein said covering layer of foamed polymeric material is in a state of mutual contact with said at least one first covering layer.

3. The optical cable according to claim 1, wherein said covering layer of foamed polymeric material is in a state of mutual contact with said at least one second covering layer.

4. The optical cable (10) according to claim 1, further comprising a reinforcing layer in a position radially external to said covering layer of foamed polymeric material.

5. The optical cable according to claim 4, wherein said reinforcing layer comprises dielectric yarns selected from the group comprising:
    aramidic yarns, glass-fiber yarns, carbon-fiber yarns, or yarns based on polyester or polypropylene.

6. The optical cable according to claim 1, wherein the expandable polymeric material of said at least one covering layer of foamed polymeric material is selected from:
    a) copolymers of ethylene with an ethylenically unsaturated ester, in which the amount of unsaturated ester is between 5 and 80 wt. %;
    b) elastomeric copolymers of ethylene with at least one $C_3$-$C_{12}$ α-olefin, and optionally a diene, having the following composition: 35-90 mol. % of ethylene, 10-65 mol. % of α-olefin, 0-10 mol. % of diene;
    c) copolymers of ethylene with at least one $C_4$-$C_{12}$ α-olefin, and optionally a diene, having a density between 0.86 and 0.90 g/cm$^3$; or
    d) polypropylene modified with ethylene/$C_3$-$C_{12}$α-olefin copolymers, where the weight ratio between polypropylene and the ethylene/$C_3$-$C_{12}$ α-olefin copolymer is between 90/10 and 30/70.

7. The optical cable according to claim 1, wherein the expansion degree of said foamed polymeric material is between 20% and 250%.

8. The optical cable according to claim 7, wherein said expansion degree is between 50% and 150%.

9. The optical cable according to claim 1, wherein the thickness of said at least one covering layer of foamed polymeric material is between 0.5 and 3.0 mm.

10. The optical cable according to claim 9, wherein said thickness is between 1.0 and 2.5 mm.

11. The optical cable according to 1, wherein said foamed polymeric material has a density between 0.4 and 0.6 kg/dm$^3$.

12. The optical cable according to claim 1, wherein said foamed polymeric material has a tensile modulus at 20° C. between 400 and 600 MPa.

13. The optical cable according to claim 1, wherein said expandable polymeric material has a density between 0.85 and 1.10 kg/dm$^3$.

14. The optical cable according to claim 1, wherein said expandable polymeric material has a tensile modulus at 20° C. between 700 and 1,100 MPa.

15. The optical cable according to claim 1, wherein the thickness of said at least one first covering layer is between 0.5 and 2.0 mm.

16. The optical cable according to claim 15, wherein said thickness is between 0.7 and 1.5 mm.

17. The optical cable according to claim 1, wherein the thickness of said at least one second covering layer is between 0.5 and 3.0 mm.

18. The optical cable according to claim 17, wherein said thickness is between 0.9 and 2.0 mm.

* * * * *

UNITED STATES PATENT AND TRADEMARK OFFICE
CERTIFICATE OF CORRECTION

| | | |
|---|---|---|
| PATENT NO. | : 7,302,143 B2 | Page 1 of 1 |
| APPLICATION NO. | : 10/479484 | |
| DATED | : November 27, 2007 | |
| INVENTOR(S) | : Ginocchio et al. | |

It is certified that error appears in the above-identified patent and that said Letters Patent is hereby corrected as shown below:

Title page, item (54), line 1, and Col. 1, line 1, "PROVIDE" should read --PROVIDED--.

Title page, item (73), "Pirelli & C. S.p.A.," should read --Prysmian Cavi e Sistemi Energia S.r.l.,--.

Claim 1, column 19, line 21, "kg/dm3" should read --$kg/dm^3$--.

Claim 6, column 20, line 6, "ethylene/$C_3$-$C_{12}$α-olefin" should read --ethylene/$C_3$-$C_{12}$ α-olefin--.

Claim 11, column 20, line 20, "to 1," should read --to claim 1,--.

Signed and Sealed this

Seventeenth Day of June, 2008

JON W. DUDAS
*Director of the United States Patent and Trademark Office*